US012158352B2

(12) United States Patent
Park et al.

(10) Patent No.: US 12,158,352 B2
(45) Date of Patent: Dec. 3, 2024

(54) VEHICLE AND METHOD FOR GENERATING MAP CORRESPONDING TO THREE-DIMENSIONAL SPACE (71) Applicant: SEOUL ROBOTICS CO., LTD., Seoul (KR)

(72) Inventors: Jaeil Park, Seoul (KR); HanBin Lee, Seoul (KR); Dong Ha Chung, Seoul (KR); Hong Minh Truong, Suwon-si (KR)

(73) Assignee: Seoul Robotics Co., Ltd., Seoul (KR)

(*) Notice: Subject to any disclaimer, the term of this patent is extended or adjusted under 35 U.S.C. 154(b) by 164 days.

(21) Appl. No.: 17/636,292

(22) PCT Filed: Sep. 18, 2020

(86) PCT No.: PCT/KR2020/012654
§ 371 (c)(1),
(2) Date: Feb. 17, 2022

(87) PCT Pub. No.: WO2021/060778
PCT Pub. Date: Apr. 1, 2021

(65) Prior Publication Data
US 2022/0291012 A1 Sep. 15, 2022

(30) Foreign Application Priority Data
Sep. 27, 2019 (KR) .......... 10-2019-0120132

(51) Int. Cl.
*G01C 21/00* (2006.01)
*G06T 7/207* (2017.01)
(Continued)

(52) U.S. Cl.
CPC ....... *G01C 21/3804* (2020.08); *G01C 21/387* (2020.08); *G06T 7/207* (2017.01);
(Continued)

(58) Field of Classification Search
CPC .......... G01C 21/3804; G01C 21/387; G01C 21/3807; G01C 21/3841; G06T 7/207;
(Continued)

(56) References Cited

U.S. PATENT DOCUMENTS 8,989,944 B1 * 3/2015 Agarwal ................. G01S 15/86
340/576
10,816,654 B2 * 10/2020 Rohani ................ G01S 13/876
(Continued)

FOREIGN PATENT DOCUMENTS

JP  2005-337863 A  12/2005
JP  2011-186808 A   9/2011
(Continued)

OTHER PUBLICATIONS

International Search Report and Written Opinion mailed Dec. 15, 2020 in International Application No. PCT/KR2020/012654. (English translation of ISR.).
(Continued)

*Primary Examiner* — Wilson W Tsui
(74) *Attorney, Agent, or Firm* — Knobbe, Martens, Olson & Bear, LLP (57) ABSTRACT

This application relates to a vehicle and method for generating a map corresponding to a three-dimensional space. In one aspect, the vehicle includes a sensor unit configured to sense a three-dimensional space by using at least one sensor and output spatial information in a plurality of frames and a memory storing computer executable instructions. The vehicle may also include a processor configured to execute the computer-executable instructions to predict a position of an object corresponding to a current frame by using an object movement model based on the plurality of frames, remove the object from the current frame based on the predicted position of the object, update a map database,
(Continued)

which includes a predetermined number of previous frames, with the current frame from which the object is removed, and generate a map corresponding to the three-dimensional space based on the updated map database.

13 Claims, 9 Drawing Sheets

(51) Int. Cl.
    *G06T 7/38* (2017.01)
    *G06T 7/50* (2017.01)
    *G06T 7/70* (2017.01)

(52) U.S. Cl.
    CPC .................. *G06T 7/38* (2017.01); *G06T 7/50* (2017.01); *G06T 7/70* (2017.01); *G06T 2207/10028* (2013.01); *G06T 2207/30252* (2013.01)

(58) Field of Classification Search
    CPC .... G06T 7/38; G06T 7/50; G06T 7/70; G06T 2207/10028; G06T 2207/30261; G05D 1/0088; G05D 1/0246; G05D 1/0274
    See application file for complete search history.

(56) References Cited

U.S. PATENT DOCUMENTS

| | | | |
|---|---|---|---|
| 11,442,463 B1* | 9/2022 | Fotland | ................ G05D 1/0088 |
| 2008/0199050 A1* | 8/2008 | Koitabashi | ................ G06T 7/80 |
| | | | 382/107 |
| 2020/0074729 A1* | 3/2020 | Yan | ........................ G06F 18/251 |
| 2020/0180612 A1* | 6/2020 | Finelt | ................... G05D 1/0088 |
| 2020/0184231 A1* | 6/2020 | Viswanathan | ... G06V 30/19173 |
| 2020/0264609 A1* | 8/2020 | Hammond | ........... G05D 1/0246 |
| 2021/0056712 A1* | 2/2021 | Daudelin | .............. G01S 7/4808 |

FOREIGN PATENT DOCUMENTS

| | | |
|---|---|---|
| JP | 2012-118666 A | 6/2012 |
| JP | 2015-179514 A | 10/2015 |
| JP | 2016-126662 A | 7/2016 |
| JP | 2017-151536 A | 8/2017 |
| KR | 10-2019-0062635 A | 6/2019 |
| WO | WO 2018/185972 A1 | 11/2018 |

OTHER PUBLICATIONS

Office Action dated Nov. 26, 2020 in Korean Application No. 10-2019-0120132.

Notice of Allowance dated Mar. 17, 2021 in Korean Application No. 10-2019-0120132.

Ciberlin et al: "Object detection and object tracking in front of the vehicle using front view camera", 2019 Zooming Innovation in consumer technologies conference (ZINC), IEEE, May 29, 2019, pp. 27-32 XP033580375.

Danelljan et al: "Accurate Scale Estimation for Robust Visual Tracking", Proceedings of the British machine vision conference 2014, pp. 65.1-65.11, XP055430130.

European Search Report received in Application No. 20869015.6 dated Oct. 17, 2023 in 9 pages.

* cited by examiner

VEHICLE AND METHOD FOR GENERATING MAP CORRESPONDING TO THREE-DIMENSIONAL SPACE

The present application is a U.S. national phase application under 35 U.S.C. § 371 of International Application No. PCT/KR2020/012654, filed on Sep. 18, 2020, which claims the benefit of Korean Patent Application No. 10-2019-0120132 filed on Sep. 27, 2019 in the Korean Intellectual Property Office, the entire disclosure of each of which is incorporated herein by reference.

TECHNICAL FIELD

The present disclosure relates to a vehicle and method for generating a map corresponding to a three-dimensional space.

BACKGROUND ART

To safely and accurately control devices such as autonomous vehicles, drones, and robots, it is important to collect a sufficient amount of data to control their movements. For example, when a sufficient amount of point cloud data, that is, information on point clouds, is not collected using a LiDAR sensor, which is a typical example of a sensor capable of detecting an object in a three-dimensional space, it is difficult to control the motion of a device such as an autonomous vehicle, a drone, or a robot. To address this, a method of preparing a high-resolution map in advance and providing the high-resolution map to a device such as an autonomous vehicle, a drone, or a robot may be considered. In this case, however, resources are needed for storing a huge amount of data, and the high-resolution map has to be constantly updated to reflect situations varying in real time.

DESCRIPTION OF EMBODIMENTS

Technical Problem

The present disclosure provides a vehicle and method for generating a map corresponding to a three-dimensional space based on a map database which is updated with spatial information in the latest frame while being maintained to have a predetermined number of frames, and also provides a computer program stored in a computer-readable storage medium.

Solution to Problem

According to a first aspect, a vehicle may include: a sensor unit configured to sense a three-dimensional space by using at least one sensor and output spatial information in a plurality of frames; a memory storing computer executable instructions; and a processor configured to execute the computer-executable instructions to predict a position of an object corresponding to a current frame by using an object movement model based on the plurality of frames, remove the object from the current frame based on the predicted position of the object, update a map database, which includes a predetermined number of previous frames, with the current frame from which the object is removed, and generate a map corresponding to the three-dimensional space based on the updated map database.

According to a second aspect, there is provided a method of generating a map using spatial information in a plurality of frames, and the method may include: predicting a position of an object corresponding to a current frame by using an object movement model based on a plurality of frames; removing the object from the current frame based on the predicted position of the object; updating, with the current frame from which the object is removed, a map database including a predetermined number of previous frames; and generating a map corresponding to a three-dimensional space based on the updated map database.

According to a third aspect, a computer program stored in a computer-readable storage medium may perform, in an electronic power device, a method of generating a map using spatial information in a plurality of frames, the method including: predicting a position of an object corresponding to a current frame by using an object movement model based on a plurality of frames; removing the object from the current frame based on the predicted position of the object; updating, with the current frame from which the object is removed, a map database including a predetermined number of previous frames; and generating a map corresponding to a three-dimensional space based on the updated map database.

BEST MODE

According to a first aspect, a vehicle may include: a sensor unit sensing a three-dimensional space by using at least one sensor and outputting spatial information in a plurality of frames; a memory storing computer executable instructions; and a processor executing the computer-executable instructions to predict a position of an object corresponding to a current frame by using an object movement model based on the plurality of frames, remove the object from the current frame based on the predicted position of the object, update a map database, which includes a predetermined number of previous frames, with the current frame from which the object is removed, and generate a map corresponding to the three-dimensional space based on the updated map database.

Mode of Disclosure

Hereinafter, various embodiments will be described in detail with reference to the drawings. The embodiments described below may be modified and implemented in various different forms. To more clearly describe embodiments, those well-known to a person of ordinary skill in the art will not be described in detail.

The embodiments relate to a vehicle and method for generating a map corresponding to a three-dimensional space, and a computer program stored in a computer-readable storage medium, and in the following description, those well-known to a person of ordinary skill in the art will not be described in detail.

Figure 1:
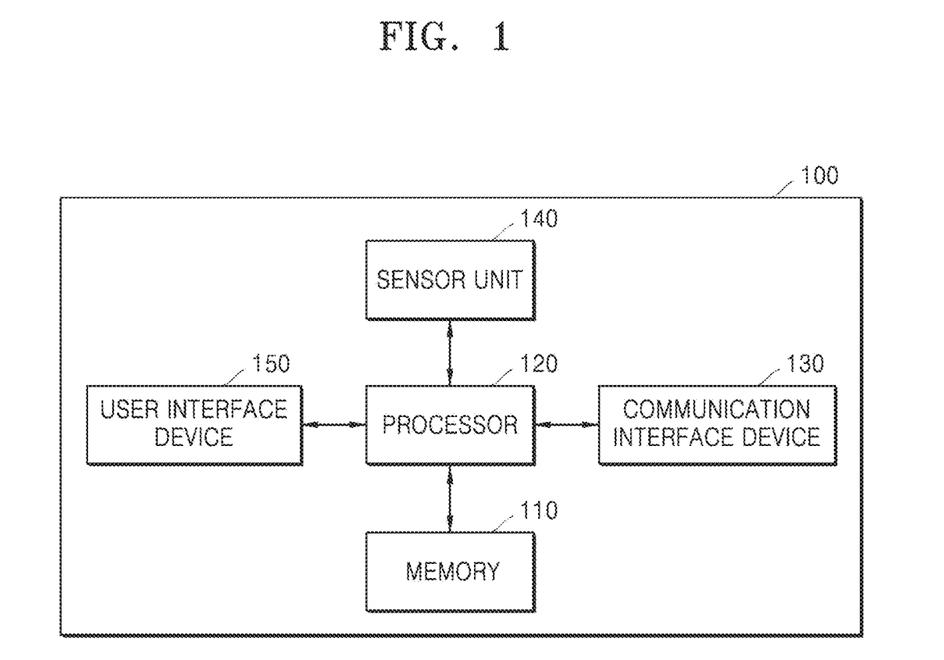
FIG. 1 is a block diagram illustrating a configuration of a vehicle according to an embodiment.

FIG. 1 is a block diagram illustrating a configuration of a vehicle 100 according to an embodiment.

The vehicle 100 may be a traveling device such as a car or a train, which is capable of traveling on a road or track. However, the term "vehicle 100" may broadly refer to an aircraft such as a drone or an airplane capable of traveling in the air rather than on a road or track, or a craft such as a boat or a ship capable of traveling on the sea, and more broadly, the term "vehicle 100" may refer to as an electronic power device such as a robot. Hereinafter, for ease of description, the term "vehicle 100" will be used, and examples in which the vehicle 100 is an autonomous vehicle will be described.

For traveling, the vehicle 100 may directly acquire spatial information on a surrounding three-dimensional space by using a sensor. The vehicle 100 may receive, from the outside, spatial information that could not be directly acquired, to previous acquire spatial information on a wider space corresponding to the traveling direction. For example, the vehicle 100 may receive pieces of spatial information respectively from other nearby vehicles. Hereinafter, a method of generating a map corresponding to a three-dimensional space by using spatial information obtained through the vehicle 100 to control the traveling of the vehicle 100 will be described in detail.

Referring to FIG. 1, according to an embodiment, the vehicle 100 may include a memory 110, a processor 120, a communication interface device 130, a sensor unit 140, and a user interface device 150. Those of ordinary skill in the art to which the embodiment pertains will understand that the vehicle 100 may further include other general-purpose components other than the components shown in FIG. 1.

The memory 110 may store software and/or programs. For example, the memory 110 may store applications, programs such as an application programming interface (API), and various types of data. The memory 110 may store instructions executable by the processor 120.

The processor 120 may access and use data stored in the memory 110, or store new data in the memory 110. The processor 120 may execute instructions stored in the memory 110. The processor 120 may execute a computer program installed on the vehicle 100. In addition, the processor 120 may install, on the memory 110, a computer program or application received from the outside. The processor 120 may include at least one processing module. The processing module may be a processing module dedicated to executing a predetermined program. For example, the processor 120 may include various types of processing modules to execute vehicle control programs for autonomous driving such as an Advanced Driver Assistance System (ADAS), or processing modules to execute three-dimensional space tracking programs on separate dedicated chips. The processor 120 may control other components included in the vehicle 100 such that the other components may be operated perform operations corresponding to results obtained by executing instructions or computer programs.

The communication interface device 130 may perform wireless communication with other devices or networks. To this end, the communication interface device 130 may include a communication module that supports at least one of various wireless communication methods. For example, the communication interface device 130 may include a communication module for performing short-distance communication such as Wireless Fidelity (Wi-Fi), various types of mobile communication such as 3G, 4G, or 5G communication, or ultra-wideband communication. The communication interface device 130 may be connected to a device located outside the vehicle 100 and may transmit/receive signals or data to/from the device. The vehicle 100 may communicate with other vehicles through the communication interface device 130 or may be connected to a server that manages an area in which the vehicle 100 is located.

The sensor unit 140 may include at least one sensor configured to sense a three-dimensional space. The sensor unit 140 may detect an object located within a detection range, and may acquire data for generating the coordinate of the detected object in a three-dimensional space. The sensor unit 140 may acquire shape data or distance data on the object located within the detection range. The sensor unit 140 may include at least one of various types of sensors such as a light detection and ranging (LiDAR) sensor, a radar sensor, a camera sensor, an infrared image sensor, and an ultrasonic sensor.

To acquire spatial information about a three-dimensional space, a plurality of sensors of the same type or a combination of sensors of different types may be used by considering the detection range of each type of sensor or the type of data obtainable using each type of sensor. For example, the sensor unit 140 may include at least one three-dimensional LiDAR sensor to obtain data on a 360-degree-range space, and may further include at least one of a radar sensor and an ultrasonic sensor to obtain data on a blind area that cannot be detected with the three-dimensional LiDAR sensor or data on a proximity space within a predetermined distance from the vehicle 100.

The user interface device 150 may receive user input or the like from a user. The user interface device 150 may display information such as results of execution of a computer program in the vehicle 100, results of processing which correspond to user input, the state of the vehicle 100, or the like. The user interface device 150 may include hardware units for receiving input or providing output, and a software module dedicated to driving the hardware modules. For example, the user interface device 150 may be a touch screen, but is not limited thereto.

Although not shown in FIG. 1, the vehicle 100 may further include components for autonomous driving, such as a Global Positioning System (GPS) and an Inertial Measurement Unit (IMU). The GPS is a satellite navigation system configured to receive signals from GPS satellites and calculate the current position of the vehicle 100. The IMU is a device configured to measure the speed and direction of the vehicle 100, gravity, and the acceleration of the vehicle 100. The processor 120 may obtain information on the movement and posture of the vehicle 100 by using the GPS and the IMU. The processor 120 may acquire other information on the control of the vehicle 100 from other sensors or memories provided in the vehicle 100.

The names of the above-described components of the vehicle 100 may be changed, and the vehicle 100 may be configured to include at least one of the above-described components, not to include some of the components, or to further include other components.

The vehicle 100 may travel when only a portion to be used for driving of the vehicle 100 is obtained in real time from a map reflecting the latest information. Hereinafter, a detailed description will be given of how the vehicle 100 generate a map corresponding to a three-dimensional space based on a map database in which spatial information on the latest frame is updated while the map database is maintained with a predetermined number of frames.

The processor 120 may execute computer-executable instructions to predict the position of an object corresponding to the current frame by using an object movement model based on a plurality of frames. The current frame refers to a frame which the processor 120 acquires in real time and may be a frame including the latest spatial information among a plurality of frames consecutively input to the processor 120. The processor 120 may execute computer-executable instructions to predict the position of an object corresponding to the current frame by applying a time difference between the current frame and the previous frame to the object movement model, which reflects frames up to the previous frame and estimates the movement of the object.

The processor 120 may execute computer-executable instructions to remove the object included in the current frame based on a predicted position of the object in the current frame.

The processor 120 may execute computer-executable instructions to update the map database including a predetermined number of previous frames by using the current frame from which the object is removed. The processor 120 may execute computer-executable instructions to register the current frame, from which the object is removed, in the map database including the previous frames, and may estimate, based on results of the registration, the position of a new point cloud in the current frame from which the object is removed. The processor 120 may execute computer-executable instructions to remove a predetermined frame from the map database based on the estimated position of the new point cloud and the position of a reference point set in the map database, and then to add the current frame, from which the object has been removed, to the map database, from which the predetermined frame has been removed.

In detail, the processor 120 may execute computer-executable instructions to compare the difference between the estimated position of the new point cloud and the position of the reference point with a predetermined value, and remove one of a frame first stored in the map database and a frame last stored in the map database according to results of the comparison. The processor 120 may execute computer-executable instructions to remove the frame first stored in the map database when results of the comparison show that the difference is equal to or greater than the predetermined value, and remove the frame last stored in the map database when results of the comparison show that the difference is less than the predetermined value. Because the position of the reference point is set in the frame first stored in the map database, when the frame first stored in the map database is removed, the position of the reference point may be set in a frame next to the removed frame. The processor 120 may execute computer-executable instructions to add the current frame, from which the object is removed, to the map database from which one of the frames has been removed.

In addition, the processor 120 may execute computer-executable instructions to perform, as a process parallel to a process of removing the object from the current frame and updating the map database, a process in which the position of the object corresponding to a frame next to the current frame is predicted by detecting and tracking the object in the current frame through the object movement model in which frames up to the current frame are reflected. The predicted position of the object corresponding to the frame next to the current frame may be directly used to remove the object from the next frame.

The processor 120 may execute computer-executable instructions to generate a map corresponding to a three-dimensional space based on the updated map database. In the updated map database, only a given number of frames containing spatial information may be maintained to optimize a resource for storing data, and spatial information of the latest frame may be constantly updated to guarantee the freshness of information. Because removal of a previous frame from the map database and addition of the current frame to the map database are constantly performed to guarantee the freshness of spatial information and maintain a proper number of frames, a map generated corresponding to a three-dimensional space on the basis of the constantly updated map database may be referred to as a "volatile map."

Figure 2:
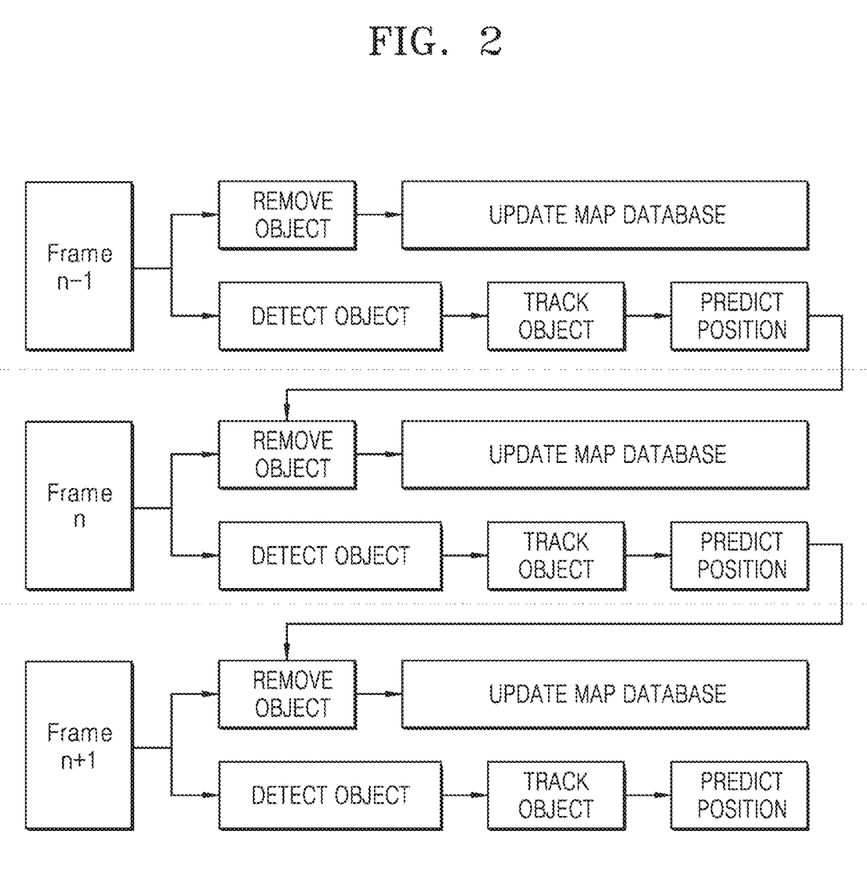
FIG. 2 is a view illustrating a process of updating a map database for generating a map with spatial information in a plurality of frames.

FIG. 2 is a view illustrating a process of updating a map database with spatial information in a plurality of frames for generating a map.

To generate a map using spatial information in a plurality of frames, moving objects are detected in the frames and removed from the frames, and then the frames from which the moving objects are removed are used. In this case, because a process of directly detecting objects included in one frame may require a large amount of computation and may thus take a long processing time, the total processing time for a plurality of frames may increase when such a process of directly detecting objects in a frame is performed each time a frame is consecutively input.

Therefore, as shown in FIG. 2, a process such as a process of tracking an object and predicting the position of the object by estimating the movement of the object may be performed in parallel to increase the efficiency of all processes by tracking an object detected in a previous frame and estimating the movement of the object to indirectly detect the position of the object in the next frame. In this case, parallel processing refers to the case of simultaneously performing portions of two or more processes and is not limited to the case in which two processes start at the same time and end at the same time. In other words, a first process and a second process, which are performed in parallel, do not need to be started at the same time or ended at the same time, and it is sufficient that one of the first and second processes starts while the other process is being performed.

With reference to FIG. 2, a first workflow process will now be described as an example in which an object is detected and tracked in a detected three-dimensional space based on time-sequential spatial information on the three-dimensional space, that is, based on a plurality of consecutively input frames, and the position of the object is predicted by estimating the movement of the object.

The vehicle 100 may distinguish a ground region and an object region based on spatial information in a frame. The vehicle 100 may separate point cloud data estimated as the ground region from entire point cloud data of the frame to distinguish the point cloud data corresponding to the ground region from point cloud data corresponding to the object region. Based on at least one piece of distance information, shape information, and distribution information, the vehicle 100 may perform clustering on the point cloud data corresponding to the object region to distinguish the point cloud data according to objects and thus distinguish individual object regions.

The vehicle 100 may identify at least one object and obtain object information on the identified object by using a neural network-based object classification model. The neural network-based object classification model may be trained with training image database constructed for each object. The neural network-based object classification model may estimate object information on each identified object from point cloud data corresponding to the identified object based on at least one piece of distance information, shape information, and distribution information. The vehicle 100 may detect a moving object such as an automobile, a light-weight vehicle, a two-wheeled vehicle, or a pedestrian through the neural network-based object classification model.

The vehicle 100 may track objects in a three-dimensional space based on information on individual object regions distinguished by performing clustering on point cloud data in a plurality of frames, and object information on the objects identified using the neural network-based object classification model. The vehicle 100 may track all the objects in the three-dimensional space without missing by combining the object information, which is obtained from the individual object regions distinguished through the clustering, with the object information, which is estimated by the neural network-based object classification model.

The vehicle 100 may track all objects in a detected three-dimensional space by continuously acquiring information on all the objects in the detected three-dimensional space over time from spatial information in a plurality of frames of the sensed three-dimensional space. For example, the vehicle 100 may track the speed and movement direction of each object based on variations in the position of the object over time by a method such as an object tracking method using a Kalman filter.

The vehicle 100 may predict information on a tracked object based on results of tracking. The vehicle 100 may predict the position of an object corresponding to the next frame by using the object movement model which is based on a plurality of frames. The vehicle 100 may estimate the movement of an object by accumulating information obtained by tracking the object and deriving, from the accumulated tracking information, a mathematical model for estimating the movement of the object.

With reference to FIG. 2, a second workflow process will now be described as an example of removing an object from each frame based on a plurality of consecutively input frames and updating a map database with the frame from which the object has been removed.

As shown in FIG. 2, instead of directly detecting an object in the current frame n to remove the object from the current frame n, the vehicle 100 may predict the position of the object corresponding to the current frame n by using an object movement model in the previous frame n−1 and may remove the object from the current frame n based on results of the prediction. The vehicle 100 may apply the time difference between the current frame n and the previous frame n−1 to the object movement model, which is based on frames previous to the current frame n to predict the position of a moving object corresponding to the current frame n, and based on the predicted position of the object, the vehicle 100 may remove the moving object from the current frame n.

The vehicle 100 may perform a process of registering, in the map database, the current frame n from which the object is removed, in the map database, such that the map database including a predetermined number of frames previous to the current frame n may be updated with the current frame n from which the object is removed. Therefore, the position of a new point cloud may be estimated in the current frame n by comparing spatial information in the current frame n with spatial information in the map database. Because the position of the new point cloud indicates a position change relative to a map, which is based on the map database including previous frames, the position of the new point cloud may also be used as information on the movement of the vehicle 100 for tracking an object.

Based on results of the registration of the current frame n, from which the object is removed, in the map database, the vehicle 100 may estimate the position of the new point cloud in the current frame n from which the object is removed, and depending on variations in the estimated position of the new point cloud, the vehicle 100 may determine a method of updating the map database with the current frame n from which the object is removed. Before adding the current frame n, from which the object has been removed, to the map database, a frame to be removed from the map database for maintaining the number of frames of the map database and uniform distribution of point clouds may be determined depending on variations in the position of the new point cloud. This will be described with reference to FIGS. 3 and 4.

Figure 3:
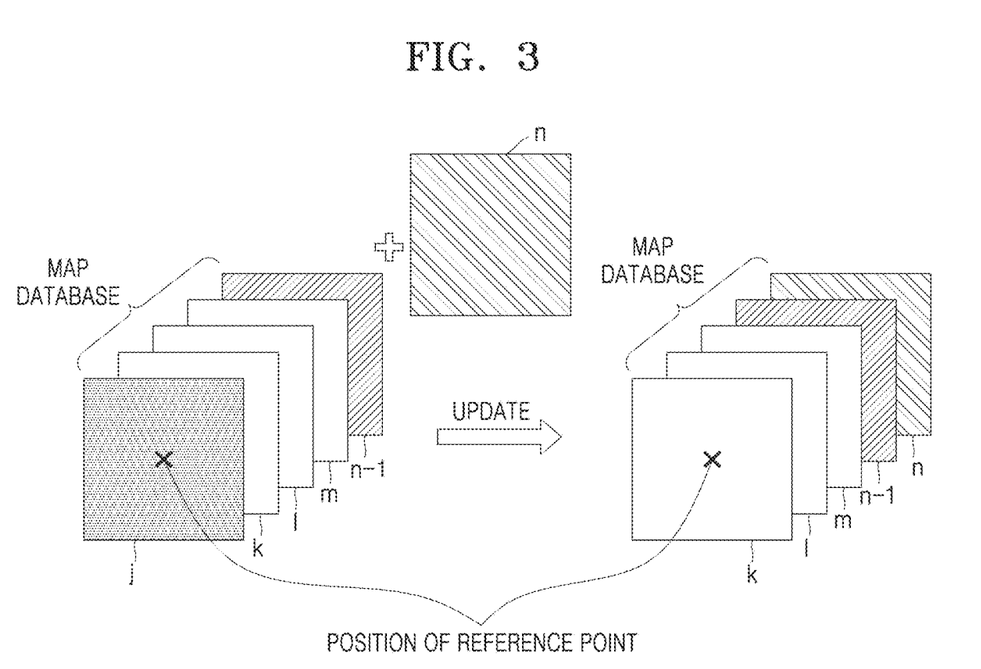
FIG. 3 is a view illustrating an example of removing a frame first stored in a map database when updating the map database including a predetermined number of frames.

FIG. 3 is a view illustrating an example of removing a frame first stored in a map database when updating the map database including a predetermined number of frames.

The vehicle 100 may compare the position of a new point cloud in the current frame n, from which an object is removed, with the position of a reference point, which is set in the map database, and when the position of the new point cloud is sufficiently distant from the position of the reference point, the vehicle 100 may remove the spatial information of the oldest point cloud, that is, a frame j, which is first stored in the map database. The position of the reference point, which is set in the map database is a reference point for determining variations in the position of the new point cloud, may be set in the frame j first stored in the map database, and in this case, when the frame j is removed from the map database, the position of the reference point may be set in a frame k, which is next to the removed frame.

As shown in FIG. 3, the frame j first stored in the map database in time sequence may be removed from the map database, and the map database may be updated with the current frame n from which the object is removed.

Figure 4:
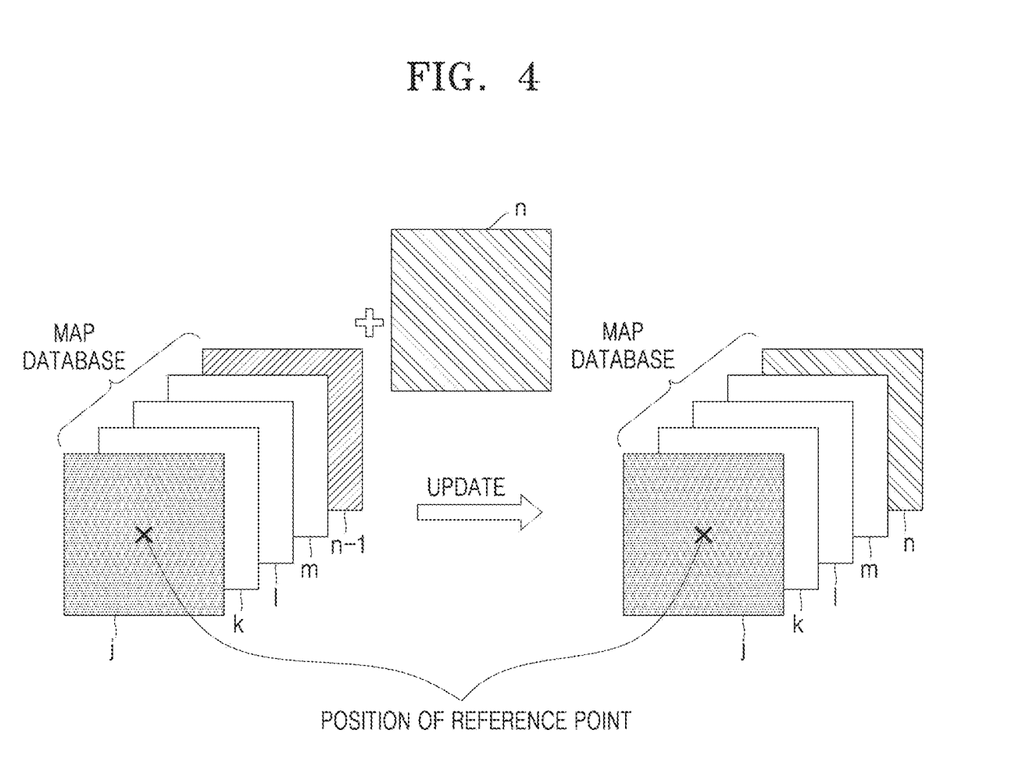
FIG. 4 is a view illustrating an example of removing a frame last stored in a map database when updating the map database including a predetermined number of frames.

FIG. 4 is a view illustrating an example of removing a frame last stored in a map database when updating the map database including a predetermined number of frames.

The vehicle 100 may compare the position of a new point cloud in the current frame n, from which an object is removed, with the position of a reference point, which is set in the map database, and when the position of the new point cloud is not sufficiently distant from the position of the reference point, the vehicle 100 may remove the spatial information of a point cloud which is last updated, that is, a frame n−1, which is last stored in the map database.

As shown in FIG. 4, the frame n−1 last stored in the map database in time sequence may be removed from the map database, and the map database may be updated with the current frame n from which the object is removed. The freshness of the map database may be guaranteed by removing the previous frame n−1 immediately preceding the current frame n from which the object is removed. That is, even when the position of the new point cloud has not moved a sufficient distance from the position of the reference point, the frame last stored in the map database, that is, the previous frame n−1 immediately preceding the current frame n, may be removed from the map database to guarantee the freshness of the map database. In this case, the position of the reference point does not change.

Referring back to FIG. 2, it could be understood that the first workflow process and the second workflow process are performed in parallel on the same frame. In addition, it could be understood that results of the first workflow process performed on each frame are input to the second workflow process performed on the next frame, and thus the second workflow process is efficiently performed.

Figure 5:
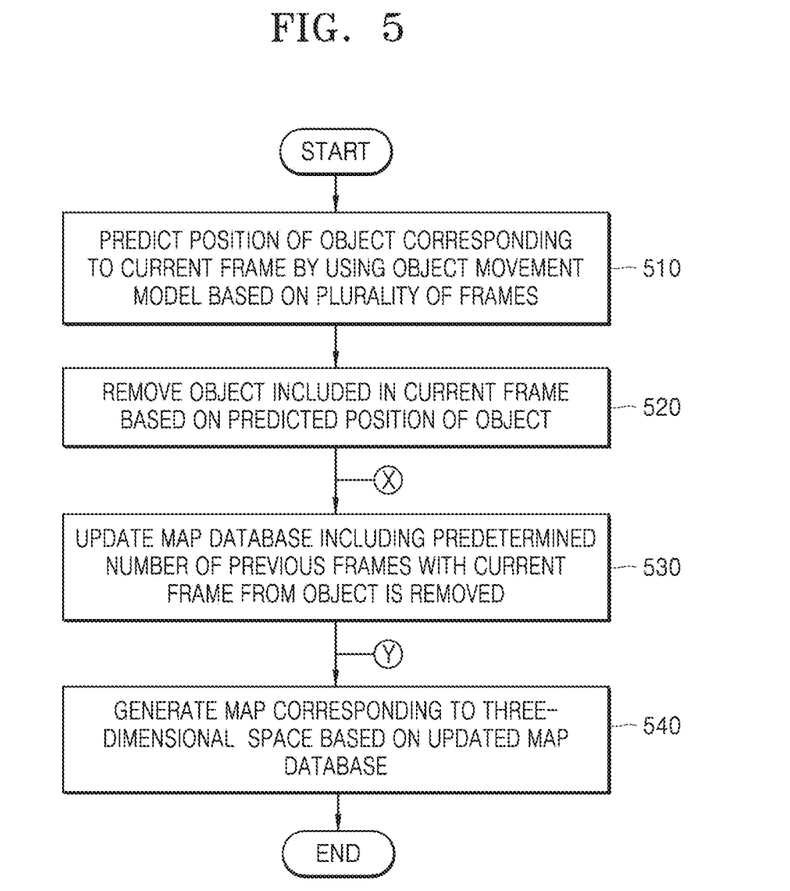
FIG. 5 is a flowchart illustrating a method of generating a map corresponding to a three-dimensional space.

FIG. 5 is a flowchart illustrating a method of generating a map corresponding to a three-dimensional space.

In operation 510, the vehicle 100 may predict the position of an object corresponding to the current frame by using an object movement model, which is based on a plurality of frames. Instead of directly detecting the object in the current frame, the vehicle 100 may predict the position of the object corresponding to the current frame by estimating the movement of the object through the application of a time difference between the current frame and the previous frame to the object movement model in which frames up to the previous frame are reflected.

In operation 520, the vehicle 100 may remove the object from the current frame based on the predicted position of the object. The vehicle 100 may predict the position and direction of the object corresponding to the current frame by using the object movement model and the frame immediately preceding the current frame, generate a bounding box of predicted objects, and remove spatial information, which is in the form of a point cloud in the bounding box, from the current frame.

In operation 530, the vehicle 100 may update a map database including a predetermined number of previous frames with the current frame from which the object is removed.

Furthermore, in parallel to operation 520 of removing the object from the current frame and operation 530 of updating the map database, the vehicle 100 may detect and track the object included in the current frame to predict the position of the object corresponding to the next frame immediately following the current frame by using the object movement model in which frames up to the current frame are reflected.

In operation 540, the vehicle 100 may generate a map corresponding to a three-dimensional space based on the updated map database.

Figure 6:
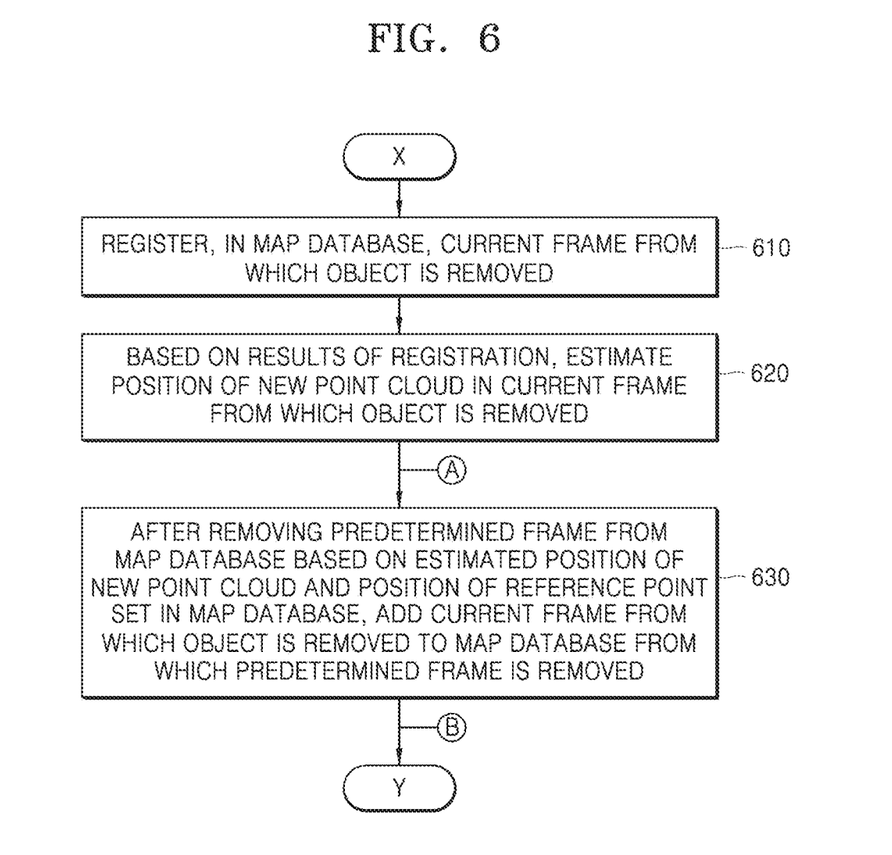
FIG. 6 is a detailed flowchart illustrating operations of updating the map database.

FIG. 6 is a detailed flowchart illustrating operations of updating the map database.

In operation 610, the vehicle 100 may register the current frame, from which the object is removed, in the map database.

In operation 620, the vehicle 100 may estimate the position of a new point cloud in the current frame from which the object is removed, based on results of the registration.

In operation 630, the vehicle 100 may remove a predetermined frame from the map database based on the estimated position of the new point cloud and the position of a reference point, which is set in the map database, and then the vehicle 100 may add the current frame from which the object is removed, to the map database from which the predetermined frame is removed.

Figure 7:
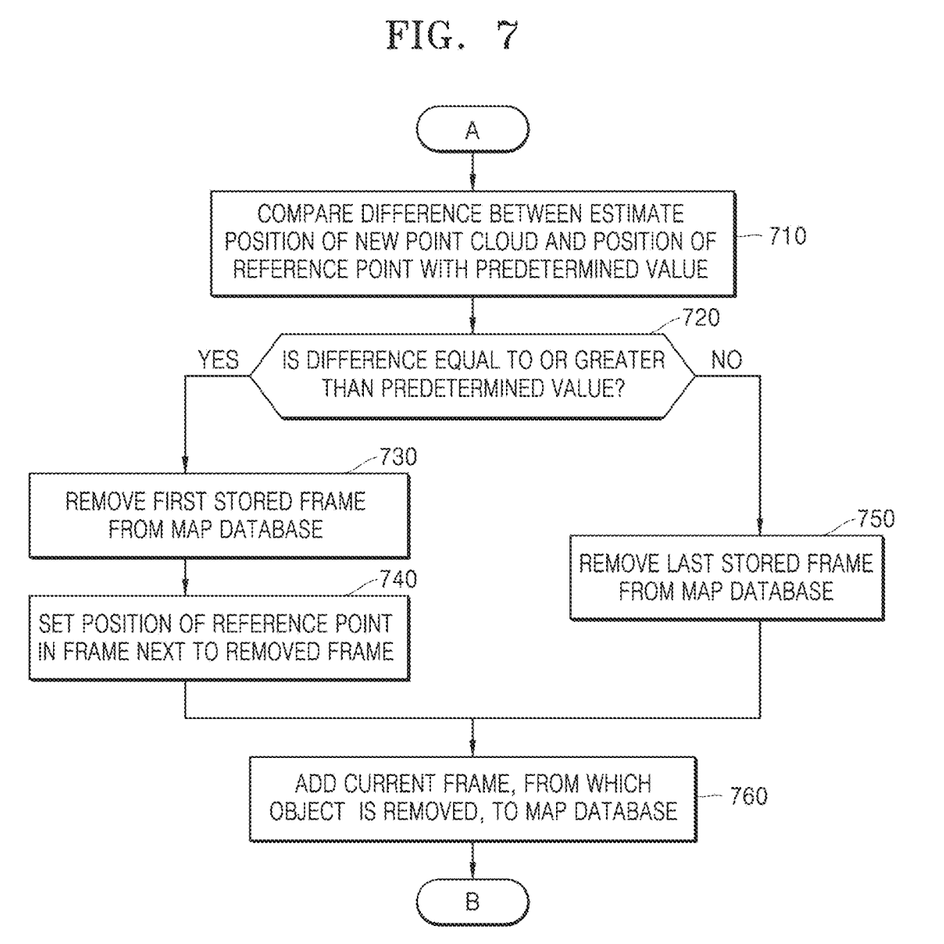
FIG. 7 is a detailed flowchart illustrating operations of adding the current frame to the map database after removing a frame from the map database.

FIG. 7 is a detailed flowchart illustrating operations of adding the current frame after removing a frame from the map database.

In operation 710, the vehicle 100 may compare the difference between the estimated position of the new point cloud and the position of the reference point set in the map database with a predetermined value. The position of the reference point may be set in a frame first stored in the map database.

In operation 720, the vehicle 100 may determine, based on results of the comparison in operation 710, whether the difference is greater than or equal to the predetermined value. In operation 730 or 750, according to results of the comparison, the vehicle 100 may remove, from the map database, one of the frame first stored in the map database and a frame last stored in the map database from the map database.

When results of the comparison shows that the difference is equal to or greater than the predetermined value, the vehicle 100 may remove the first stored frame from the map database in operation 730.

When the first stored frame is removed from the map database, the vehicle 100 may set the position of the reference point, which was set in the removed frame, in the frame next to the removed frame in operation 740.

When results of the comparison shows that the difference is less than the predetermined value, the vehicle 100 may remove the last stored frame from the map database in operation 750.

In operation 760, the vehicle 100 may add the current frame, from which the object is removed, to the map database from which one of the frame first stored in the map database and the frame last stored in the map database is removed.

Figure 8A:
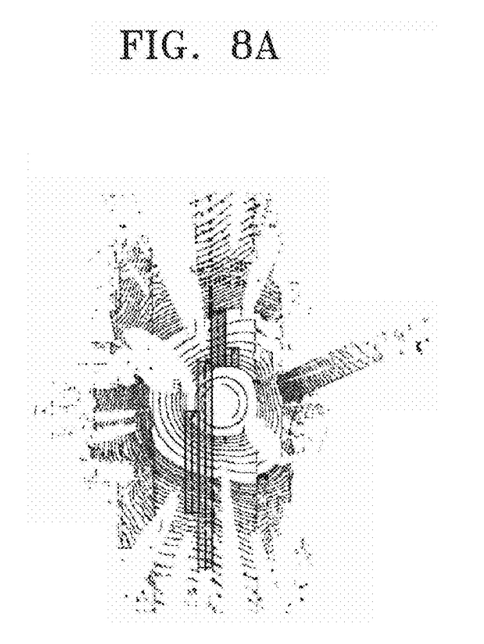
FIGS. 8A and 8B are views illustrating a case in which a map is generated using spatial information in one frame and a case in which a map is generated using a map database including a predetermined number of frames.
Figure 8B:
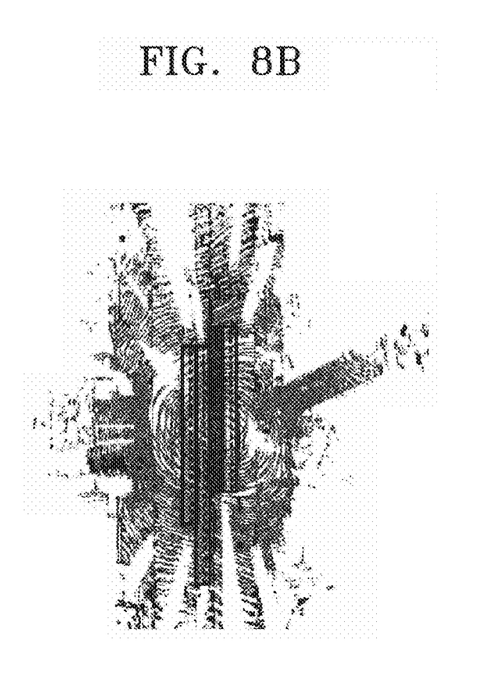

FIGS. 8A and 8B are views illustrating a case in which a map is generated using spatial information in one frame and a case in which a map is generated using a map database including a predetermined number of frames.

FIGS. 8A and 8B illustrate examples of generating maps for detecting lanes using spatial information on a three-dimensional space sensed by a LiDAR sensor. As shown in FIG. 8A, when a map is generated using spatial information in a single frame, it is difficult to detect lanes because the amount of point cloud is not sufficient. In addition, as shown in FIG. 8B, when a map corresponding to a three-dimensional space is generated based on a map database in which spatial information of the latest frame is updated while a predetermined number of frames are maintained, the amount of point cloud is sufficient and thus lanes may be detected more accurately in a wider area than in the case shown in FIG. 8A.

Each of the above-described embodiments may be implemented in the form of a computer program or application, which is stored in a computer-readable storage medium for performing a method of generating a map corresponding to a three-dimensional space in an electronic power device such as a vehicle, a drone, or a robot. In other words, each of the above-described embodiments may be implemented in the form of a computer program or application, which is stored in a computer-readable storage medium for performing a method including operations in which an electron power device generates a map using spatial information in a plurality of frames.

The above-described embodiments may be implemented in the form of computer-readable storage media that store data and instructions executable by computers or processors. At least one of the instructions and at least one piece of the data may be stored in the form of a program code, and when executed by a processor, a predetermined program module may be generated to perform a predetermined operation. Examples of such computer-readable storage media include read-only memories (ROMs), random-access memories (RAMs), flash memories, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks (SSDs), and any devices capable of storing instructions or software, related data, data files, and data structures, and providing the instructions or software, the related data, the data files, and the data structures to processors or computers for execution thereof.

Embodiments have been described. Those of ordinary skill in the art to which the embodiments pertain will understand that the embodiments may be implemented in modified forms without departing from the essential characteristics thereof. Therefore, the embodiments should be considered in a descriptive sense only and not for purposes of limitation. The scope of the present disclosure is defined not by the above-described embodiments but by the appended claims, and all differences within the scope will be construed as being included in the present disclosure.

The invention claimed is:

1. A vehicle comprising:
 a sensor configured to sense at least one or more objects in a physical three-dimensional space and acquire spatial information including at least one or more positions and at least one of a shape or a distance of the one or more objects sensed within a detection range of the sensor, and output the spatial information into a plurality of frames;
 a memory storing computer-executable instructions; and
 a processor configured to execute the computer-executable instructions to:
  predict a position of an object corresponding to a first frame corresponding to a first time by using an object movement model based on the plurality of frames,
  remove the object from the first frame based on the predicted position of the object and generate a first map frame in which the object is removed,
  access a map database comprising a predetermined number of second map frames, each of the second map frames corresponding to a second time, the first time being later than the second time of any one of the second map frames,
  update the map database with the first map frame to generate an updated map database, and
  generate a map corresponding to the three-dimensional space based on the updated map database,
 wherein, to generate the updated map database, the processor is further configured to:
  select one of the second map frames based on an estimated position of a point cloud of the first map frame and a position of a reference point set in the map database,
  remove the selected second map frame from the map database, and
  add the first map frame to the map database to generate the updated map database such that, in the updated map database, the selected second map frame is replaced with the first map frame corresponding to the first time that is later than the second time that the selected second map frame corresponds to.

2. The vehicle of claim 1, wherein the processor is further configured to execute the computer-executable instructions to predict the position of the object corresponding to the first frame by estimating a movement of the object through application of a time difference between the first frame and a latest frame of the second map frames, the latest frame being closest to the first frame among the second map frames.

3. The vehicle of claim 1, wherein the processor is further configured to execute the computer-executable instructions to:
 predict, in parallel to remove the object from the first frame and update the map database, the position of the object corresponding to a frame next to the first frame using the object movement model reflecting frames up to the first frame by detecting and tracking the object in the first frame.

4. The vehicle of claim 1, wherein the processor is further configured to execute the computer-executable instructions to compare a difference between the estimated position of the point cloud of the first map frame and the position of the reference point set in the map database with a predetermined value, remove, among the second map frames, one of a first stored frame and a last stored frame from the map database according to results of the comparison, and add the first map frame to the map database from which one of the first stored frame and the last stored frame is removed.

5. The vehicle of claim 4, wherein the processor is further configured to execute the computer-executable instructions to remove the first stored frame from the map database when results of the comparison show that the difference is greater than or equal to the predetermined value, and remove the last stored frame from the map database when results of the comparison show that the difference is less than the predetermined value.

6. The vehicle of claim 4, wherein the position of the reference point is set in the first stored frame of the map database, and
 the processor is further configured to execute the computer-executable instructions to set the position of the reference point in a frame next to the removed frame when the first stored frame is removed from the map database according to results of the comparison.

7. A method of generating a map using spatial information, the method comprising:
 sensing, by a sensor, at least one or more objects in a physical three-dimensional space and acquiring spatial information including at least one or more positions and at least one of a shape or a distance of the one or more objects sensed within a detection range of the sensor and outputting the spatial information into a plurality of frames;
 predicting a position of an object corresponding to a first frame corresponding to a first time by using an object movement model based on the plurality of frames;
 removing the object from the first frame based on the predicted position of the object and generating a first map frame in which the object is removed;
 accessing a map database comprising a predetermined number of second map frames, each of the second map frames corresponding to a second time, the first time being later than the second time of any one of the second map frames;
 updating the map database with the first map frame to generate an updated map database; and
 generating a map corresponding to the three-dimensional space based on the updated map database,
 wherein the updating comprises:
  selecting one of the second map frames based on an estimated position of a point cloud of the first map frame and a position of a reference point set in the map database, removing the selected second map frame from the map database, and adding the first map frame to the map database to generate the updated map database such that, in the updated map database, the selected second map frame is replaced with the first map frame corresponding to the first time that is later than the second time that the selected second map frame corresponds to.

8. The method of claim 7, wherein the predicting of the position of the object comprises predicting the position of the object corresponding to the first frame by estimating a movement of the object through application of a time difference between the first frame and a latest frame of the second map frames, the latest frame being closest to the first frame among the second map frames.

9. The method of claim 7, further comprising predicting the position of the object corresponding to a latest frame of the second map frames, the latest frame being closest to the first frame among the second map frames by detecting and tracking the object in the first frame using the object movement model in which frames up to the first frame are reflected, wherein the predicting of the position of the object is performed in parallel to the removing of the object from the first frame and the updating of the map database.

10. The method of claim 7, wherein the adding of the first frame comprises:

comparing a difference between the estimated position of the point cloud of the first map frame and the position of the reference point set in the map database with a predetermined value;

removing, from the map database, among the second map frames, one of a frame first stored in the map database and a frame last stored in the map database; and adding the first map frame to the map database from which one of the first stored frame and the last stored frame is removed.

11. The method of claim 10, wherein the removing of one of the first stored frame and the last stored frame comprises removing the frame first stored in the map database when results of the comparison show that the difference is greater than or equal to the predetermined value, and removing the frame last stored in the map database when results of the comparison show that the difference is less than the predetermined value.

12. The method of claim 10, wherein the position of the reference point is set in the frame first stored in the map database, and, when the frame first stored in the map database is removed according to results of the comparison, the removing of one of the first stored frame and the last stored frame further comprises setting the position of the reference point in a frame next to the removed frame.

13. A non-transitory computer-readable storage medium storing instructions, when executed by one or more processors, causing the one or more processors to perform the method of claim 7.

* * * * *